United States Patent
Boldi et al.

(10) Patent No.: US 8,855,489 B2
(45) Date of Patent: Oct. 7, 2014

(54) COMMUNICATIONS METHOD, PARTICULARLY FOR A MOBILE RADIO NETWORK

(75) Inventors: Mauro Boldi, Turin (IT); Alberto Rossaro, Turin (IT); Roberto Quasso, Turin (IT); Sara Gabba, Milan (IT)

(73) Assignee: Telecom Italia S.p.A., Milan (IT)

(*) Notice: Subject to any disclaimer, the term of this patent is extended or adjusted under 35 U.S.C. 154(b) by 1719 days.

(21) Appl. No.: 11/666,115

(22) PCT Filed: Oct. 25, 2004

(86) PCT No.: PCT/IB2004/003518
§ 371 (c)(1),
(2), (4) Date: Apr. 24, 2007

(87) PCT Pub. No.: WO2006/046088
PCT Pub. Date: May 4, 2006

(65) Prior Publication Data
US 2008/0145056 A1 Jun. 19, 2008

(51) Int. Cl.
*H04B 10/20* (2006.01)
*H04J 14/02* (2006.01)

(52) U.S. Cl.
CPC ......... *H04J 14/0226* (2013.01); *H04J 14/0252* (2013.01); *H04J 14/0283* (2013.01); *H04J 14/0247* (2013.01); *H04J 14/0227* (2013.01); *H04J 14/025* (2013.01); *H04J 14/0246* (2013.01)
USPC .................... 398/59; 398/66; 398/58; 398/96

(58) Field of Classification Search
CPC .............. H04B 10/11; H04B 10/1121; H04B 10/1125; H04B 10/1127; H04B 10/1129; H04B 10/114; H04B 10/1141; H04B 10/1149; H04B 10/116; H04B 10/22; H04B 10/14; H04B 10/25; H04B 10/2575; H04B 10/25751; H04B 10/25752; H04B 10/25753; H04B 10/25754; H04B 10/25755; H04B 10/25756; H04B 10/27; H04B 10/271; H04B 10/272; H04J 14/0228; H04J 14/0232; H04J 14/0234; H04J 14/0236; H04J 14/0238; H04J 14/0241; H04J 14/0242; H04J 14/0278; H04J 14/0279; H04J 14/0283
USPC ......... 398/59, 58, 66, 68, 3, 4, 79, 67, 70, 72, 398/96, 115, 69, 71, 116, 158, 159
See application file for complete search history.

(56) References Cited

U.S. PATENT DOCUMENTS

| | | | |
|---|---|---|---|
| 5,642,405 | A | 6/1997 | Fischer et al. |
| 6,353,600 | B1 | 3/2002 | Schwartz et al. |
| 6,980,747 | B1* | 12/2005 | DeSalvo et al. ............... 398/202 |
| 7,421,203 | B2* | 9/2008 | Kim et al. ...................... 398/59 |

FOREIGN PATENT DOCUMENTS

| | | |
|---|---|---|
| JP | 2002-247010 | 8/2002 |
| WO | WO 2004/019524 A1 | 3/2004 |
| WO | WO 2004/047472 A1 | 6/2004 |

* cited by examiner

*Primary Examiner* — M. R. Sedighian
(74) *Attorney, Agent, or Firm* — Finnegan, Henderson, Farabow, Garrett & Dunner, L.L.P.

(57) ABSTRACT

Communications method between a main station and processing nodes includes interconnecting the main station and the nodes in an optical path defining adjacent nodes and non-adjacent nodes, operatively grouping the nodes in a plurality of distinct sub-groups, each formed by non-adjacent nodes, at least one of said sub-groups including at least two nodes generating at the main station a multiplexed optical signal propagating along the path for serving the nodes, the multiplexed optical signal including a plurality of optical channel signals having a respective plurality of distinct carrier wavelengths, each carrier wavelength being associated with a respective sub-group of nodes, and serving each node of each sub-group of nodes with a respective portion of the optical channel signal having the associated carrier wavelength.

32 Claims, 6 Drawing Sheets

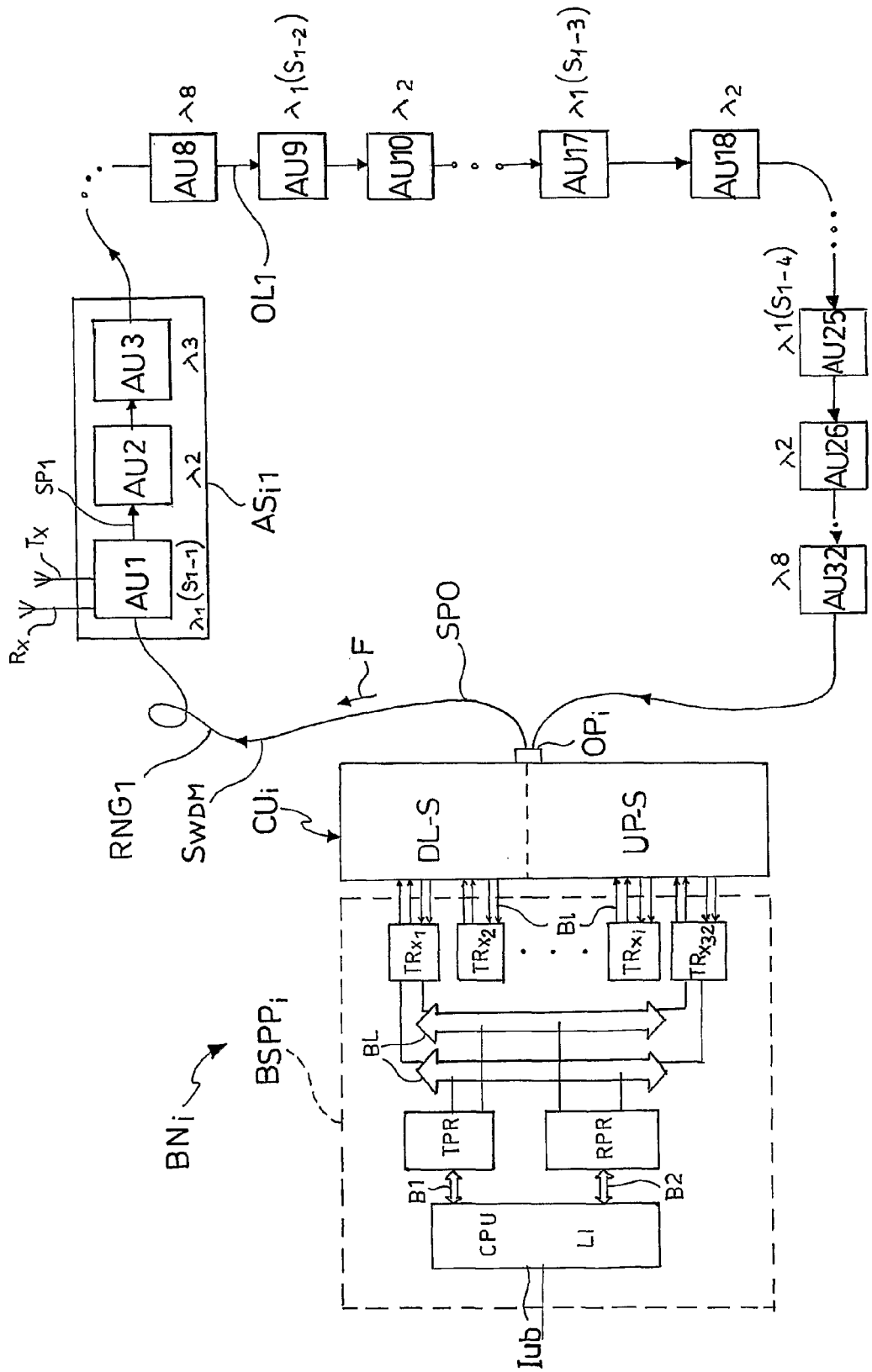

COMMUNICATIONS METHOD, PARTICULARLY FOR A MOBILE RADIO NETWORK

CROSS REFERENCE TO RELATED APPLICATIONS

This application is a national phase application based on PCT/IB2004/003518, filed Oct. 25, 2004, the content of both of which is incorporated herein by reference.

BACKGROUND OF THE INVENTION

1. Field of the Invention

The present invention relates to an optical communications network comprising a main station and a plurality of processing nodes and employing wavelength division multiplexing. Preferably, the present invention concerns optical network employed in a mobile radio communications network.

2. Description of the Related Art

As is known, at the main hierarchical levels of a conventional cellular mobile radio communications network there are the following: a switching center for processing the calls of mobile radio communications traffic and for managing the interface with the public telephone network, radio base stations connected and controlled by the switching center, and mobile stations (or terminals) in communication with the radio base stations.

In general, the technological choice forming the basis of cellular networks consists in associating the various radio base stations with a respective area or cell within the territory. Moreover, in principle, each cell has associated with it a group of radio channels which may also be reused in another cell, situated at given distance from the first cell and if necessary also adjacent thereto, depending on the type of mobile radio communications system.

According to conventional architecture of cellular networks, the radio base stations, which are located in sites spread over the territory covered by the mobile radio communications system, have the function of performing suitable processing of signals received from the mobile terminals (uplink) or to be transmitted thereto (downlink). In particular, according to conventional architectures, the radio base station houses those apparatus which have the main functions of receiving/transmitting voice or data signals and which perform coding or decoding thereof in accordance with a particular mobile radio communications system used, for example, the UMTS system (Universal Mobile Telecommunication System).

A particular type of mobile radio communications network uses optical fiber links between suitable nodes or units of the network. This type of communication is termed Radio over Fiber (RoF) and, generally, it can be divided into two different typologies of communications systems: RoF systems based upon analog transmission over fiber and RoF systems based upon digital transmission over fiber.

In connection with the first above mentioned typology, document WO-A-2004/019524 describes a wireless communications network including base station hotel and a remote cell site wherein multiple uplink and downlink signals are transmitted using a single optical fiber. According to this document, an analog multiplexing RF (Radio Frequency) transport technique is employed. At the base station hotel a number of downlink RF signals are frequency translated to corresponding downlink IF (Intermediate Frequency) signals having N distinct intermediate frequencies. The resulting frequency shifted signals are then combined and the resulting IF signal is converted to an optical signal centered at wavelength λd. This optical signal is transmitted over a single optical fiber from the base station to the remote site where it is converted into an IF signal and split into its N components centered at distinct IF frequencies. These IF components are then frequency shifted to a common carrier frequency, thereby recovering the original downlink RF signals generated by the base station. These N downlink signals are then transmitted from the antennas at the remote site to cellular subscribers in the cell's service area.

Moreover, U.S. Pat. No. 6,353,600 describes a CDMA (Code Division Multiplexed Access) cellular communications network in which centralized traffic channel resources are distributed to remote cells by use of WDM (Wavelength Division Multiplexing) on optical fibers. In accordance with this documents, the remote cells include optical add-and-drop multiplexers which selectively drop respective downlink optical signals from the optical fibers. In the above patent, it is stated that there is a predetermined one-to-one correspondence between the selected downlink optical wavelengths and directional antenna in a remote cell.

In connection with the digital RoF systems, U.S. Pat. No. 5,642,405 describes a microcellular communications network including a plurality of base station units and corresponding remote units provided with antennas. The remote units are connected through fibers to respective base station units using wave division multiplexing. A base station unit comprises transmitter banks having an output connected to an analog-to-digital converter which digitizes and frames radiofrequency signals and applies an optical output to a wavelength division multiplexer/demultiplexer, which is in turn connected to the fiber. This wavelength division multiplexer/demultiplexer allows to apply the optical information received from the remote units to an optical filter which filters out the signal received from the remote units as distinct optical wavelength.

Document WO-A-2004/0474472 describes a main-remote radio base station system including a plurality of N remote radio units connected in a series configuration by a single optical fiber along which the information between the main unit and the remote units propagates. According to this document, a data distribution approach over the single fiber is used to avoid the expenses of the wavelength division multiplexing technologies including laser, filters OADM, as well as the logistical overhead needed to keep track of different wavelength dependent devices. The main unit disclosed by WO-A-2004/0474472 combines N words of data, one word corresponding to each of the N remote units, into a frame and transmits the frame on the fiber. From the received frame, each remote unit removes its corresponding data words, includes an uplink word in the removed word place, and passes the frame to the next remote unit.

SUMMARY OF THE INVENTION

The Applicants have noticed that conventional optical communications networks comprising a main station and a plurality of processing nodes, particularly the ones employed in the RoF system and using digital transmission over fiber, do not exploit in satisfying manner the opportunities given by the optical communications. Particularly, the Applicants have addressed a problem of providing an optical communications network, comprising a main station and a plurality of processing nodes (advantageously, employable in a mobile radio communications of the RoF type), in which the transportation capacity offered by the optical communications is more efficiently employed than the conventional systems do.

More particularly, a problem addressed by the Applicants is to provide an optical communications system, comprising a main station and a plurality of processing nodes, that allows to increase, in comparison with the conventional systems, the length of the optical path (e.g. a fiber ring) connecting the remote nodes served by the main station showing, in addition, a cost-effective configuration.

In accordance with the invention, advantages connected to a satisfying exploitation of the capacity of optical signals have been obtained with a communications method between a main station (BSSSPi, CUi) and processing nodes (AU1-AU32), comprising:
- interconnecting said main station and said nodes in an optional path (RNG1) defining adjacent nodes and non-adjacent nodes,
- operatively grouping said nodes in a plurality of distinct sub-groups (AU1, AU9, AU17, AU25; AU8, . . . , AU32) each formed by non-adjacent nodes, at least one of said sub-groups including at least two nodes; and
- generating at the main station a multiplexed optical signal ($S_{WDM}$) propagating along said path for serving the nodes, said multiplexed optical signal comprising a plurality of optical channel signals (So1, . . . , So8) having a respective plurality of distinct carrier wavelengths ($\lambda 1$-$\lambda 8$), each carrier wavelength being associated to a respective sub-group of nodes, and
- serving each node of each sub-group of nodes with a respective portion ($S_{1\text{-}1}$) of the optical channel signal having the associated carrier wavelength ($\lambda 1$).

In further embodiments the communications method further comprises, at each node, processing at least an optical power of the optical channel signal having the associated carrier wavelength, wherein the processing of the optical power may include:
- optically-to-electrically converting said optical channel signal (So1) to obtain a digital electric signal (Se1),
- electrically processing the digital electric signal, and
- electrically-to-optically converting a signal resulting from the electrical processing, wherein said electrically processing of the digital electric signal may include electrically amplifying and re-shaping the digital electric signal, and wherein said electrically processing and said electrically-to-optically converting may be time-locked to said digital electric signal.

In preferred embodiments, the optical path of the present invention may include optical links coupling pairs of adjacent nodes, said optical links being of the passive type, wherein said optical links may include optical fibres; the main station and the processing nodes may be included in a mobile radio communications system and each of said processing nodes may be adapted to generate and receive radio signals serving at least a sector of a cell site of the mobile radio communications system; and each optical channel signal may carry sub-data streams each destined to a corresponding node of the respective sub-group, the sub-data streams being organized according to a time division multiplexing technique, wherein the propagating of said multiplexed signal may include:
- generating a first optical channel signal having a first carrier wavelength and associated with a first sub-group of nodes, said first channel signal being associated with a first electrical digital signal (Se1) comprising a plurality of sub-data streams ($S_{1\text{-}1}$-$S_{1\text{-}4}$), each node (AU1, AU9, AU17, AU25) of the first sub-group being associated with at least one corresponding sub-data stream, and
- sending said first channel signal (So1) together with the other channel signals on said optical path, wherein the serving of each node of each sub-group of nodes may include:
  - processing at a first node (AU1), included in the first sub-group, the first channel signal (So1) for extracting a first sub-data stream ($S_{1\text{-}1}$),
  - generating from said extracted first sub-data stream a corresponding first downlink radio signal (Sr) to be radiated,
- radiating said corresponding first downlink radio signal.

In other preferred embodiments, said processing at the first node may further include:
- receiving at an optical input (102) of said first node (AU1) the multiplexed signal ($S_{WDM}$),
- selecting from the multiplexed signal the first optical channel signal (So1),
- converting said first optical channel signal (So1) in the first electrical signal (Se1), and
- extracting from the first electrical signal (Se1) the first-sub-data stream ($S_{1\text{-}1}$) to be processed, so as to generate the first downlink radio signal, and may further comprise:
- receiving at an antenna input (Rx1) of said first node (AU1) a first uplink radio signal (Srr),
- processing said first uplink radio signal for generating a first uplink sub-data stream ($S_{1\text{-}1}'$),
- adding the first uplink sub-data stream ($S_{1\text{-}1}'$) to the first electrical signal (Se1) as resulting from said extracting step for generating a second electrical signal (Se1'),
- converting the second electrical signal (Se1') in an output optical signal (So1') having said first carrier wavelength ($\lambda 1$), and
- sending the output optical signal together with the other optical channel signals along said optical path.

In still other preferred embodiments of the present invention, each sub-data stream may include respective identification data for associating the sub-data stream to a corresponding node; wherein said plurality of sub-data streams may be organized according to a transport standard-protocol selected from the group: SDH (Synchronous Digital Hierarchy), SONET (Synchronous Optical Network), GbE (Gigabit Ethernet), CPRI (Common Public Radio Interface); and said optical path may comprise an optical ring (RNG1).

According to another aspect, the present invention relates to a communications network (1) including:
- a plurality of processing nodes (AU1-AU32) interconnected in an optical path (RNG1) defining non-adjacent nodes and adjacent nodes,
- a main station (BSSPi, CUi) connected to said optical path and adapted to generate a multiplexed optical signal ($S_{WDM}$) to be propagated along said path for serving the nodes, said optical signal comprising a plurality of optical channel signals (So1-So8) having a respective plurality of distinct carrier wavelengths ($\lambda 1$-$\lambda 8$),
- characterized in that said nodes are operatively grouped in a plurality of distinct sub-groups (AU1, AU9, AU17, AU25; AU8, . . . , AU32) each formed by non-adjacent nodes, at least one of said sub-groups including at least two nodes, the network being configured so as to serve each sub-group of nodes with a respective portion ($S_{1\text{-}1}$) of the optical channel signal having the associated carrier wavelength ($\lambda 1$).

In further embodiments of the network, each node includes a first apparatus (O/E1, S/P1-P/S1, E/O1) adapted to process the optical power of the corresponding optical channel signal serving the respective node (AU1), wherein said first apparatus may include:

an optical-to-electrical converter (O/E1) adapted to convert said optical channel signal to obtain a digital electric signal (Se1), an electrical processing apparatus (S/P1-P/S1) adapted to process the digital electric signal, and an electrical-to-optical converter (E/O1) adapted to convert in optical form the signal resulting from the electrical processing apparatus, wherein said optical-to-electrical converter (E/O1) may include an electrical amplifier and a re-shaping device of the digital electric signal, and wherein said electrical processing apparatus and said electrical-to-optical converter may be time-locked to said digital electric signal.

The optical path may include optical links coupling each pair of adjacent nodes, said optical links being of the passive type, wherein said optical links may include optical fibers.

In certain preferred embodiments of the network of the present invention, the main station may include:

equipment (DL-S) adapted to generate a first optical channel signal (So1) having a first carrier wavelength ($\lambda$1) and associated to a first sub-group of non adjacent nodes, said first optical signal carrying information associated to a first electrical digital signal (Se1) comprising a plurality of sub-data streams ($S_{1-1}$, $S_{1-4}$) each associated to a corresponding node (AU1, AU9, AU17, AU25) of the first sub-group, and an optical multiplexer (OM) adapted to send said first optical channel signal (So1) together with the other optical channel signals on said optical path (RNG1), wherein said first sub-group may include a first node (AU1) comprising:

a second apparatus (O/E1, S/P1, R-FR-1, DEM1) adapted to process the first optical channel signal (So1) and extract a first sub-data stream ($S_{1-1}$), a radio transmitter (R-Tx1) adapted to generate from the first sub-data stream ($S_{1-1}$) a corresponding first downlink radio signal (Sr) to be radiated, and an antenna (Tx1) for radiating said first downlink radio signal (Sr), wherein the first node (AU1) may further include:

an optical input port (102) adapted to receive the multiplexed signal ($S_{WDM}$), an optical add-and-drop device (101) adapted to select from the multiplexed signal the first optical signal (So1), a first converting device (O/E1) adapted to convert said first optical signal (So1) in the first electrical signal (Se1), and an electrical add-and-drop device (ADM) adapted to extract from the first electrical signal (Se1) the first sub-data stream ($S_{1-1}$) to be processed so as to generate the first downlink radio signal (Sr).

In other preferred embodiments of the present invention, the first node (AU1) may comprise:

a receiver device (R-Rx1) having an antenna input (Rx1) adapted to receive a first uplink radio signal (Srr) and process said first uplink radio signal so as to generate a first uplink sub-data stream ($S_{1-1}$'), the electrical add-and-drop device (ADM) being adapted to add the first uplink sub-data stream ($S_{1-1}$') to the first electrical signal (Se1) so as to generate a second electrical signal (Se1'), and a second converting device (E/O1) adapted to convert the second electrical signal (Se1') in an output optical signal having said first carrier wavelength ($\lambda$1), the optical add-and-drop device (OADM) being adapted to add the output optical signal to the multiplexed signal ($S_{WDM}$) and send the multiplexed signal along said optical path.

Other preferred embodiments which apply to the network of the present invention, are discussed above in relation to the communications method of the present invention.

BRIEF DESCRIPTION OF THE DRAWINGS

Further features and advantages of the present invention will emerge more clearly from the following detailed description of preferred embodiments thereof provided by way of example in the accompanying drawings in which:

FIG. 2 shows, in the form of functional blocks, a possible structure of a main station connected to an optical ring, included in said network;

DETAILED DESCRIPTION OF THE INVENTION

Figure 1:
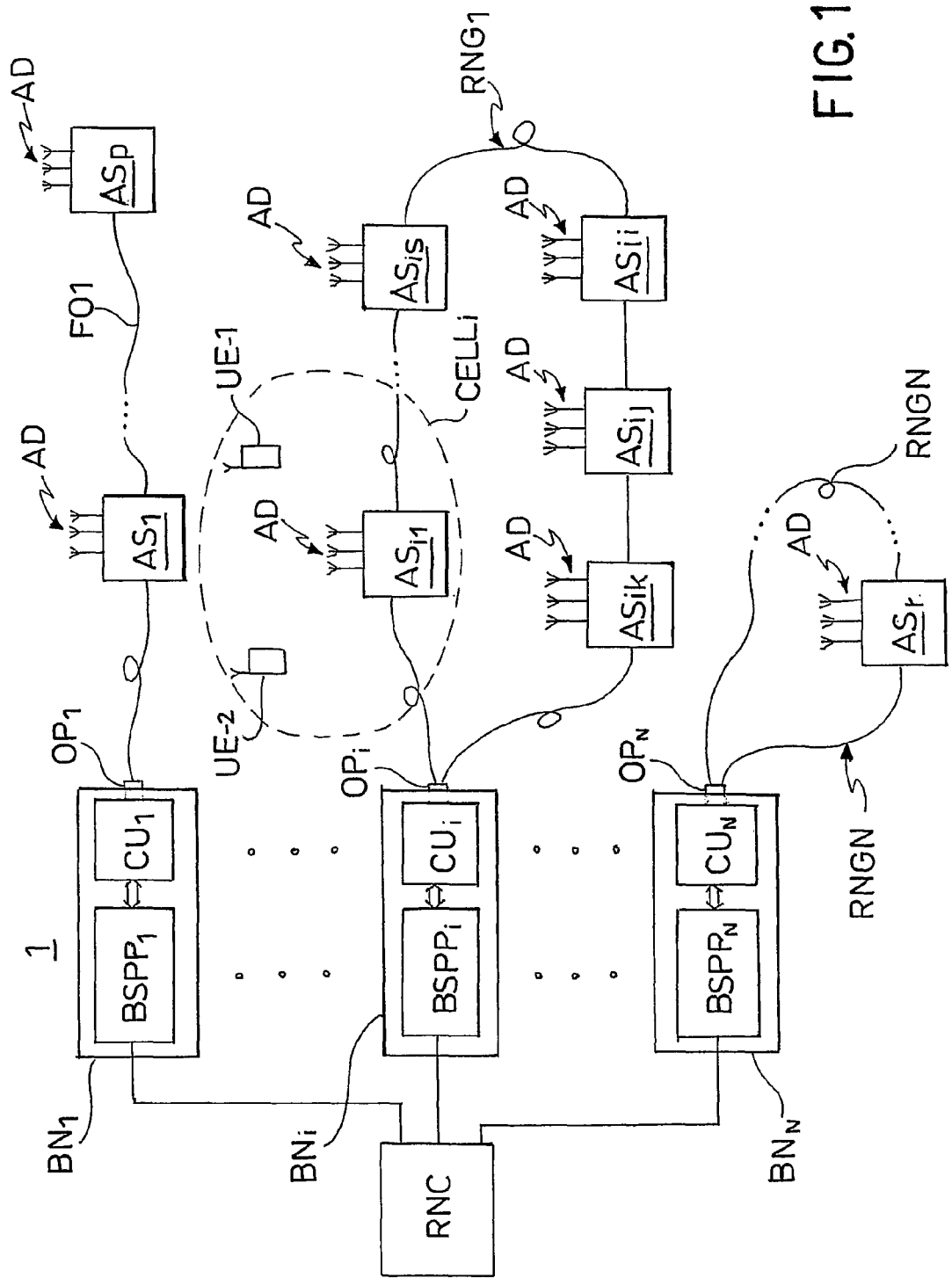
FIG. 1 shows in schematic form a mobile radio communications network according to an embodiment of the invention.

The present invention refers to an optical communications network of the type using the technique of wavelength division multiplexing (WDM) whereby several optical signals associated to transmission channels and having different carrier wavelengths are sent on the same optical fiber portion. As an example, the employed multiplexing can be a Coarse-WDM technique (using a grid with channel spacing of at least 20 nm) or a Dense-WDM technique (using a grid with channel spacing of 50 GHz or 100 GHz).

Moreover, according to a particular embodiment, the optical communications system described herein after allows to implement a mobile radio communications system of the RoF (Radio over Fiber) type.

Advantageously, reference is made to third generation cellular mobile radio communications system such as, for example, UMTS (Universal Mobile Telecommunication System). The person skilled in the art will note how the teachings of the present invention are applicable to other types of digital and analog mobile radio communications systems such as, for example, GSM (Global System for Mobile communications), D-AMPS (Digital Advanced Mobile Phone System) or analog systems such as, for example, AMPS (Advanced Mobile Phone Service), NMT (Nordic Mobile Telephone service), TACS (Total Access Communications Service, GPRS (General Packet Radio System) and Wimax (Worldwide Interoperability for Microwave Access).

The UMTS system is a system which uses wideband Code Division Multiple Access, W-CDMA. Moreover, the UMTS system supports radio access to the network both of the TDD (Time Division Duplex) type and of the FDD (Frequency Division Duplex) type. FDD access is particularly suitable for wide-area coverage such as, for example, public micro or macro-cells.

The UMTS system operates within the frequency band of 1885-2200 MHz. More particularly, the UMTS system operates within the following frequency bands: 1885-2025 MHz and 2110-2200 MHz (in Europe, 1920-1980 MHz for an FDD uplink connection, i.e. a transmitting mobile telephone and receiving base station; 2110-2170 MHz for an FDD downlink connection, i.e. a transmitting base station and receiving mobile telephone; 1900-1920 and 2010-2025 MHz for TDD, in the two transmission directions alternating over time; 1980-2010 and 2170-2200 MHz for UMTS Satellite).

The UMTS-FDD system envisages a number Nc of radio channels (for each connection, uplink and downlink), each having a band of about 5 MHz, and uses modulation of the angular type such as, for example, the QPSK (Quadrature Phase Shift Keying) modulation for downlink connection and the dual channel QPSK modulation for the uplink connection.

In accordance with CDMA technology, the channel bandwidth is shared by N users identified according to the "code" associated with them. As is known, according to CDMA technology of the direct sequence type (multiplication of the signal to be transmitted by a pseudo-random sequence with a higher bit rate), each user is assigned a code which identifies him/her in a precise manner within a frequency band in which various users are present.

FIG. 1 shows in a schematic manner a particular example of an communications network 1 implementing a radio mobile system of the UMTS type.

The network 1 according to FIG. 1 comprises a main control center RNC (Radio Network Controller for UMTS) and a subnetwork of the RoF type, including a plurality of main stations $BN_1$-$BN_N$. Each main station $BN_1$-$BN_N$ includes base station processing sections $BSPP1$-$BSPP_N$, each of which can be controlled by the control center RNC and is connected to a respective central unit $CU_1$-$CU_N$.

The communications network 1 comprises a plurality of antenna stations $AS_1$-$AS_r$ (provided with antenna devices AD), each operating in a respective cell site of the cellular mobile radio communications network. The antenna stations $AS_1$-$AS_r$ are connected to the plurality of central units $CU_1$-$CU_N$ by means of corresponding optical paths F01, . . . , RNG1-RNGN for the propagation (in a guided or in a free-space manner) of optic radiation. Preferably, said optical paths include optical fibers, typically housed in optic cables. According to an example, single-mode optical fibers are used.

The central units $CU_1$-$CU_N$ are provided with respective optical input/output ports OP1-OPN connected to one of the respective optical path F01, . . . , RNG1-RNGN. According to the particular example of FIG. 1, the path F01 is an optical fiber bus, and each of the optical paths RNG1-RNGN is an optical fiber ring. Advantageously, the optical fiber bus F01 and the optical fiber rings RNG1-RNGN may transport optical signals in both transmission directions (uplink and downlink), for example, by using separate fiber links for each transmission direction.

The mobile radio communications network 1 includes mobile telephones or terminals UE-1, UE-2 for example, of the conventional type, and adapted to send and receive transmission signals in free space to/from antenna devices AD of the antenna stations $AS_1$-$AS_r$, using the procedures of the UMTS system. The base station processing sections BSPP1, $BSPP_N$ comprise apparatus which perform the functions of processing baseband signals, whereas the central units $CU_1$-$CU_N$ perform processing of the signals to be transmitted or received in accordance with a particular protocol used for the transport of the information on the specific optical paths F01, . . . , RNG1-RNGN. The antenna stations $AS_1$-$AS_r$ comprise apparatus which process or handle radiofrequency signals.

It is pointed out that those processing functions which in conventional mobile radio communications networks are performed in the base station associated with an antenna of the network, in the case of an RoF-type system, however, are separated between the processing sections $BSPP1$-$BSPP_N$ and the antenna stations $AS_1$-$AS_r$ located in geographical locations different from the processing sections.

This separation of the functions, has the advantage of allowing easier installation of a less complex apparatus to be arranged in the vicinity of the antenna devices AD, while the remaining processing apparatus may be situated in a reduced number of main stations. FIG. 2 shows, in the form of functional blocks, a possible structure of a generic main station BNi including a base station processing section BSPPi connected to the central unit CUi which is connected to the optical fiber ring RNG1. The main station BNi has several functions, and inter alia, performs the allocation of optical carrier wavelengths and of the data streams among the antenna units connected to the optical fiber ring RNG1. In FIG. 2, the architecture of antenna station $AS_{i1}$ of the i-th cell site CELLi is also shown.

According to an example, the antenna station $AS_{i1}$ of FIG. 2 is of a three-sectors type, i.e. a station adapted to provide radio signals for every three angular sectors in which the cell site CELLi is subdivided. In accordance to a preferred embodiment of the invention the antenna station $AS_{i1}$ includes a first AU1, a second AU2 and a third antenna unit AU3, each optically coupled to the optical fiber ring RNG1 and each assigned to a specific sector of the cell site CELLi. Each of the other antenna stations $AS_{is}$, . . . , $AS_{ii}$, . . . $AS_{ij}$, $AS_{ik}$ (FIG. 1) connected by the optical fiber ring RNG1 may be of the three-sectors type or may be of a different type. Typically, antenna stations comprise at least two antenna units. According to an example, each antenna station $AS_{is}$, . . . , $AS_{ii}$, . . . $AS_{ij}$, $AS_{ik}$ includes a respective number of antenna units structurally analogous to the antenna units AU1-AU3, associated with the antenna station $AS_{i1}$.

For example, the optical fiber ring RNG1 connects thirty-two antenna units AU1-AU32. Each antenna unit AU1-AU32 is a processing node of the network 1. Particularly, the antenna units AU1-AU32 are connected in a series configuration so as to define an ordered distribution of the antenna units according to an optical propagation direction (indicated by the arrow F in FIG. 2). According to this ordered distribution, the first antenna unit AU1 (that is the nearest to the central unit CUi) is the first to be reached by an optical signal emitted by the central unit CUi, the second antenna unit AU2 is the second antenna to be reached by the optical signal and so on.

The optical fiber ring RNG1 connecting the antenna units AU1-AU32 defines groups of adjacent antenna units and a plurality of non adjacent antenna units. To the purpose of the present invention, the expression "adjacent antenna units" defines a pair of antenna units directly interconnected by a passive optical link, e.g. a portion of optical fiber along which there are no further antenna units and no regeneration stations. Particularly, along the portion of optical fiber interconnecting the pair of adjacent antenna, units the elaborations normally performed by a regeneration station are not performed, that is to say: Re-Amplification, Re-Shaping, Re-Timing of the signal carrying the useful information.

Furthermore, along the optical fiber interconnecting the pair of adjacent antenna units the following operations are not performed: optical-to electrical conversions of portions of the optical signal propagating along the optical ring RNG1, processing of the resulting electrical signal and an electrical-to-optical conversion for reinserting the corresponding optical signal in said ring RNG1.

As an example, the eighth antenna unit A8 and the ninth antenna unit A9, optically connected by a fiber link OL1, can be defined adjacent units.

The expression "non-adjacent antenna units" defines at least two antenna units optically interconnected with each other (e.g. by a portion of the optical fiber) and between them at least a further antenna unit and/or at least a regenerating station is interposed. As an example, the first antenna unit AU1 and the ninth antenna unit AU9 are non adjacent units as the units AU2-AU8 are interposed between them. Analogously, the first antenna unit AU1 and the thirty-second unit AU32 are non-adjacent units because of the presence of the central unit CUi, wherein a regeneration of optical signals occurs.

In greater detail, the base station processing section BSPPi of FIG. 2 includes an interface Iub for communications with the main control center RNC, including a processing unit CPU and associated interface lines LI. This interface Iub has, connected to it, by means of suitable buses B1 and B2, respectively, transmission and reception processing equipments TPR and RPR of the conventional type and commonly called Transmitter Processing Resources (TPR) and Receiver Processing Resources (RPR). These processing equipments TPR and RPR perform the main functions of receiving/transmitting the voice or data signals in accordance with the procedures defined by the particular mobile radio communications system used, for example UMTS. In particular, in downlink mode, the transmission equipment TPR performs coding of the voice and data signals as required by the UMTS system (spreading) and, in uplink mode, the receiving equipment RPR performs corresponding decoding (despreading).

Traditionally, these equipments TPR and RPR were installed at each base station of a mobile radio communications network, while in the solution according to the invention, these equipments may be located far from the antenna stations and may be used to serve one or more than one of these stations.

According to an example, the base station processing section BSPPi includes a group of thirty-two receivers/transmitters (or in short, transceivers) $TRx_1$-$TRX_{32}$ connected, by means of further buses and/or lines Bl, both to the equipments TPR and RPR and to the central unit CUi.

During transmission (downlink), the transceivers $TRx_1$-$TRx_{32}$ may perform modulation/demodulation (for example, of the QPSK or BPSK type) of the signals supplied by the apparatus TPR or by the central unit CUi. Preferably, the transceivers $TRx_1$-$TRx_{32}$ are adapted to transmit baseband signals (not angularly modulated) or signals at an intermediate frequency IF. Moreover, these transceivers TRx1-TRx6 may or may not perform an analog-digital conversion of the signal to be emitted.

Similarly, during reception (uplink), the transceivers $TRx_1$-$TRx_{32}$ may receive an analog or digital baseband signal or an intermediate frequency signal from the central unit CUi. The central unit CUi includes a downlink processing/conversion section DL-S and an uplink processing/conversion section UL-S connected to the transceivers $TRx_1$-$TRx_{32}$.

According to an example, each antenna unit AU1-AU3, associated with one of the three sectors of the cell site CELLi of FIG. 1, includes a respective transmitting antenna Tx and a respective receiving antenna RX (for seek of clarity, only the antennas Tx/Rx of the first unit AU1 have been shown in FIG. 2). All the antennas of the antenna station $AS_{i1}$ have been indicated with the symbol AD in FIG. 1.

Figure 3A:
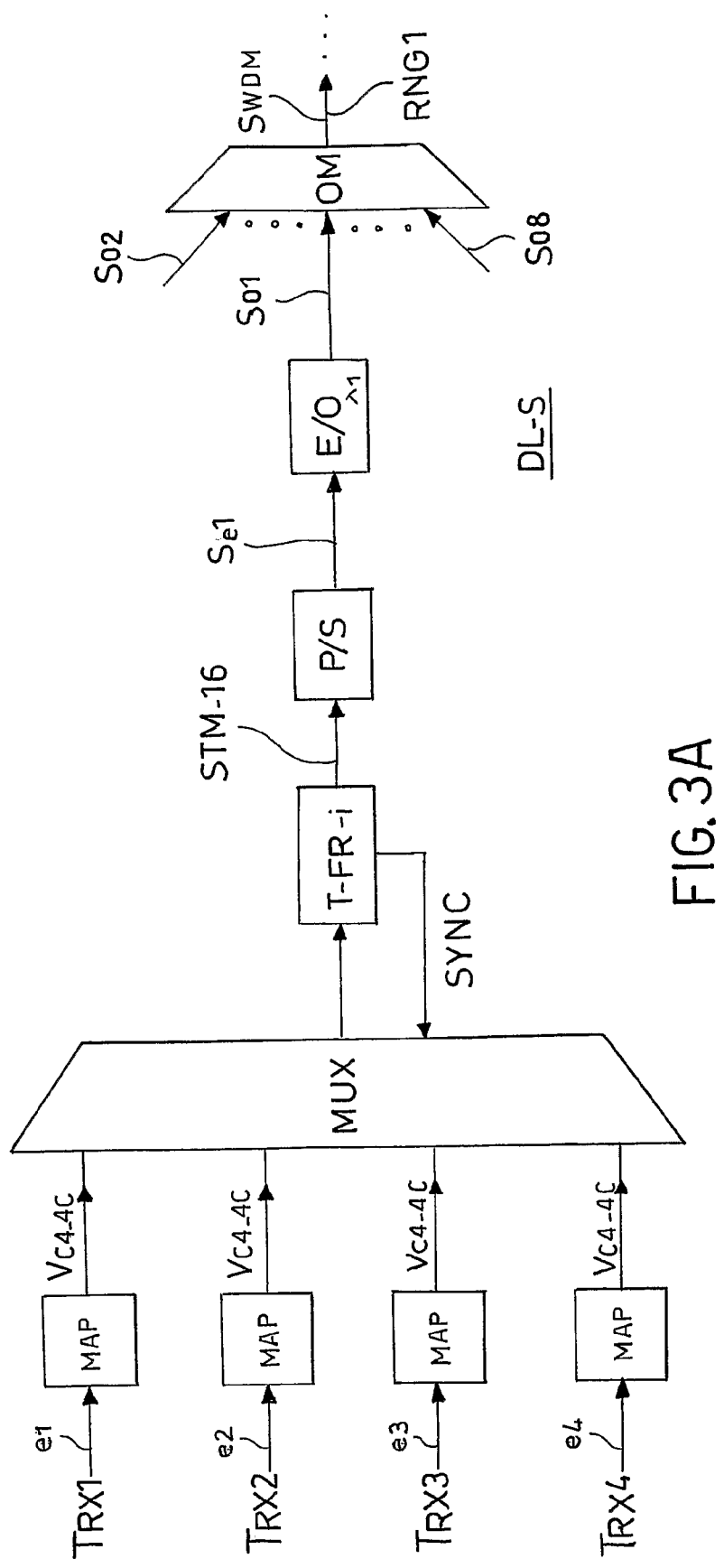
FIGS. 3A and 3B show, respectively, a possible structure of a downlink processing section and an uplink processing section, both included in a central unit employable in said main station.
Figure 3B:
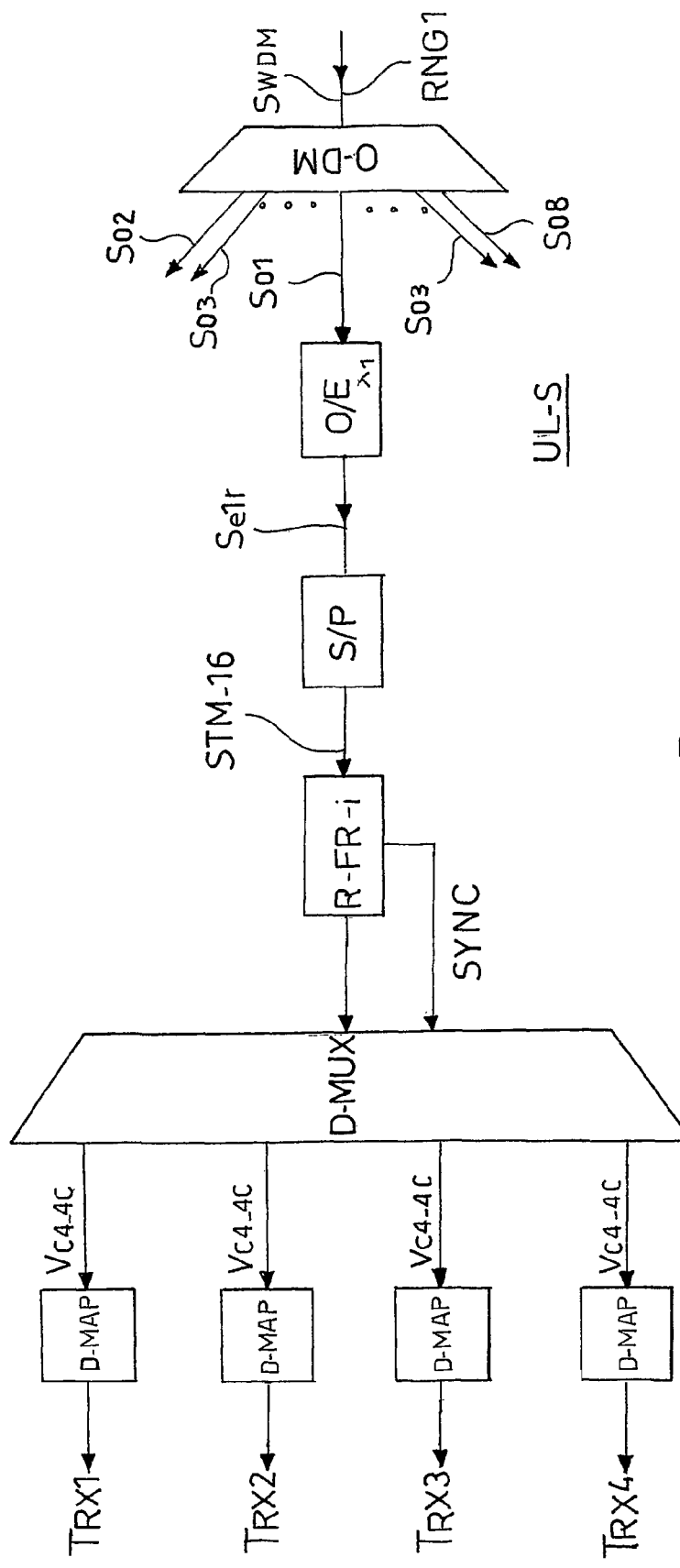

FIGS. 3A and 3B show, in greater detail, a possible structure of the downlink processing/conversion section DL-S and the uplink processing/conversion section UL-S, respectively.

The downlink processing/conversion section DL-S allows to perform processing of signals received from the base station processing section BSPPi for generating a first electrical signal Se1 including a plurality of signals each carrying useful information destined to a particular antenna unit connected to the optical ring RNG1. Particularly, the plurality of signals included in the first electrical signal Se1 is organized according to multiplexing technique, particularly, a time division multiplexing technique. Moreover, the downlink processing/conversion section DL-S allows to perform a conversion of the first electrical signal Se1 in an optical form suitable for propagation along the optical ring RNG1.

The uplink processing/conversion section UL-S is suitable to perform conversion in electrical form of an optical signal received from the optical ring RNG1 and to perform demultiplexing, particularly, time division multiplexing of the electrical signal resulting from said conversion in order to supply independent signals to the base station processing section BSPPi.

In greater detail, the downlink processing/conversion section DL-S includes, for example, a plurality of downlink processing blocks MAP for performing processing of the electrical signals (particularly, in digital form) emitted by the four transmitting sections Tx1-Tx4 of the transceivers equipments TRx1-TRx4. According to the example, four blocks MAP are provided.

According to an embodiment of the invention, the downlink processing blocks MAP operate in accordance with the SDH (Synchronous Digital Hierarchy) telecommunications standard and, in particular, perform a mapping processes that allow to insert the signals provided by the four transmitting sections Tx1-Tx4 in standard data structures known as Virtual Containers (VC4-4c in the given example). As it is clear for the skilled man, a Virtual Container carries the payload, i.e. the useful information, of an SDH module within an SDH frame. A "frame" is a data structure organized in such a way that it is possible to detect its beginning portion by means of a special bit pattern usually known as Frame Alignment Signal (FAS). Each useful data of a frame can be detected, among the other useful data of the same frame, simply by knowing its displacement with respect to the Frame Alignment Signal FAS.

The processing blocks MAP are connected to an SDH multiplexer MUX that performs a time multiplexing of the inputs signals and is connected to an input port of a transmitter framer device T-FR-i. The transmitter framer device T-FR-i is suitable to perform a frame organization of the multiplexed digital signal according to the SDH standard. As an example, the signal exiting the transmitter framer device T-FR-i is an STM-16 signal having a data physical structure comprising digital parallel words (e.g. a number of n=16 digital parallel words). The multiplexer MUX is synchronized by means of a synchronization signal SYNC produced by the transmitter framer device T-FR-i on the bases of the frame alignment signal FAS.

The transmitter framer device T-FR-i is provided with a plurality of output lines connected to a parallel-to-serial converter P/S that allows to convert the received n digital parallel words into the first electrical signal Se1 in the form of a data stream carried by a single high speed serial line. The parallel-to-serial conversion is normally used because it allows to implement the complex logic functions of the blocks preceding the parallel-to-serial converter P/S (e.g. the downlink processing blocks MAP) with circuits operating at a bit rate lower than the one of processing blocks following said converter P/S. Particularly, the bit rate of the n-bit parallel words (e.g. about 155 Mbit) is a 1/n fraction of the bit rate (e.g. 2.5 Gbit) of the data stream exiting the parallel-to-serial converter.

Figure 4:
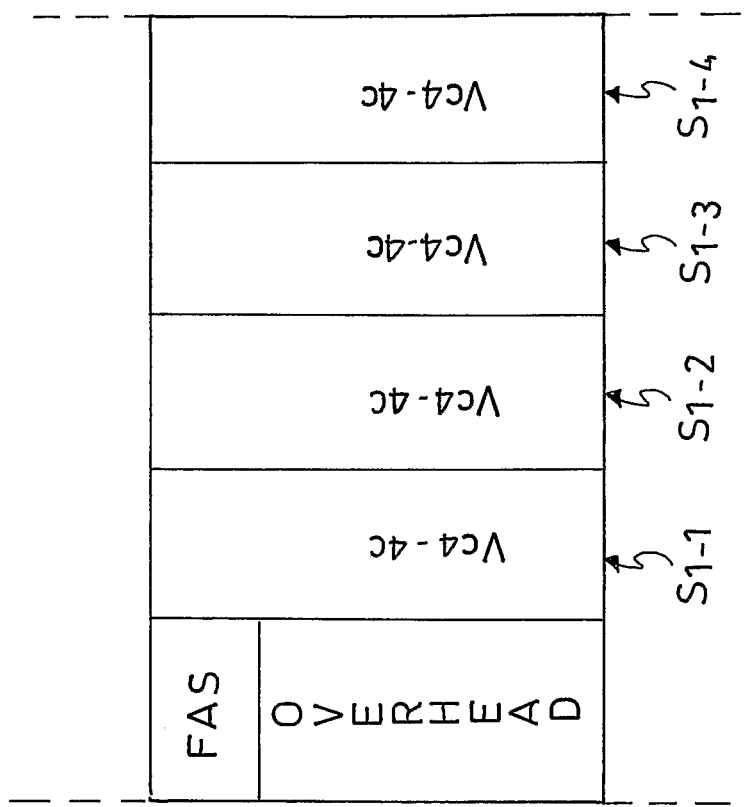
FIG. 4 shows in a schematic form an example of the frame of an electrical digital signal employable in said network.

With reference to the SDH standard, FIG. 4 shows schematically the SDH frame associated to the first electrical signal Se1. The SDH frame includes four independent Virtual Containers corresponding to respective digital signals $S_{1-1}$-$S_{1-4}$, each under the form of a sub-data stream according to a VC4-4c mapping. The organization of the sub-data streams $S_{1-3}$-$S_{1-4}$ (each carrying independent information) in the SDH frame occurs in accordance with a specific time division multiplexing technique. The SDH frame associated with the first electrical signal Se1 includes (among other signals and data) also the frame alignment signal FAS, and data for the identification of each sub-data stream $S_{1-1}$-$S_{1-4}$.

As an alternative to the SDH standard (or the equivalent SONET protocol, defined for USA), a GbE (Gigabit Ethernet), the CPRI (Common Public Radio Interface) or other suitable transport protocols developed by a specific manager of the telecommunications systems may be used.

Coming back to FIG. 3A, the output line of the parallel-to-serial converter P/S is connected to an electrical-to-optical converter E/O which may be designed to emit a first optical signal So1 of suitable wavelength such as to form one of the optical channels (having, for example a first carrier wavelength $\lambda_1$) of the D-WDM or Coarse WDM grid used in the network 1.

Preferably, this grid comprises channels spacing of about 20 nm in a band having wavelengths ranging between 1470 and 1610 nm (CWDM "Coarse WDM"). As an alternative, the electrical-to-optical converter E/O may emit a signal having a wavelength in the band around 1300 nm or in the band around 850 nm.

The optical output of the electrical-to-optical converter E/O is connected to an optical multiplexer OM which allows to multiplex the first channel optical signal So1, having the first carrier wavelength $\lambda_1$, together with other optical signals to form a WDM optical signal $S_{WDM}$, to be sent on the optical fiber ring RNG1. As an example, the WDM optical signal $S_{WDM}$ includes eight optical channel signals So1-So8 having carriers of wavelengths $\lambda_1$-$\lambda_8$, respectively.

The optical channel signals So2-So8 having optical carrier wavelengths $\lambda_2$-$\lambda_8$ can be generated by means of corresponding down-link processing/conversion sections included in the central unit CUi (not shown in FIG. 3) which may be analogous to the downlink processing/conversion section DL-S above described.

As regards the uplink, the uplink processing/conversion section UL-S is shown in FIG. 3B. The uplink processing/conversion section UL-S comprises an optical demultiplexer ODM, which is connected to an output port of the optical fiber ring RNG1 and is configured to demultiplex the WDM signal SwDM, as results from the propagation in said ring RNG1, for providing on a plurality of optical outputs the corresponding optical channel signals having one of the carrier wavelengths $\lambda_1$-$\lambda_8$. The optical demultiplexer ODM and the optical multiplexer OM are conventional devices including, as an example, at least an optical WDM coupler.

The optical output of the optical demultiplexer ODM corresponding to the first carrier wavelength $\lambda_1$, is coupled to an optical-to-electrical converter O/E (for example, a detector including a semiconductor diode) having an electrical output carrying a first received electrical signal Se1r corresponding to the above mentioned first electric signal Se1 as resulting from the processing steps occurred during the propagation along the optical fiber ring RNG1.

Advantageously, the optical-to-electrical converter O/E also includes a respective electrical trans-impedance amplifier (or another device adapted to amplify the electrical signal resulting from the optical-to-electrical conversion) and a respective limiting amplifier (or another device adapted to reshape the electrical signal resulting from the optical-to-electrical conversion). The trans-impedance amplifier and the limiting amplifier are not shown in the figures and are not detailed described as they are well known to the skilled man and are normally included in the conventional optical-to-electrical converter.

The electrical output of the optical-to-electrical converter O/E is connected to a serial-to-parallel converter S/P having a respective single high speed serial input line and a plurality of output lines (e.g. a number of n=16 output lines are employed). The serial-to parallel converter S/P allows to convert the received data stream associated to the first received electrical signal Se1r into a digital parallel words carried by the plurality of n output lines. This conversion allows to employs processing blocks, following the serial-to-parallel S/P converter, working at a bit rate (e.g. 155 Mbit) lower than the bit rate employed by the blocks proceeding said serial-to-parallel converter (e.g. the optical-to-electrical converter O/E working at about 2.5 Gbit).

The serial-to parallel converter S/P may be of the conventional type and is provided with a clock data recovery unit (not shown in the figures) adapted to recover from the signal exiting the optical-to-electrical converter O/E a timing signal necessary for correctly synchronize the serial-to-parallel conversion.

The plurality of output lines of the serial-to-parallel converter S/P are connected to a receiver framer device R-FR-i which has the known function of performing the receiving processing of the frame of the input signal according to the SDH protocol. This receiver framer device R-FR-i detects, within the received frame, the frame alignment signal FAS on the bases of which produces the corresponding synchronization signal SYNC.

The receiver framer device R-FR-i is connected to an electrical demultiplexer D-MUX which on the bases of the synchronization signal SYNC can separate the signals having different Virtual Containers on independent outputs. The electrical demultiplexer D-MUX shows each output connected to an uplink processing block D-MAP, which extracts the useful information carried in the Virtual Container VC4-4c in order to send it to the corresponding receiving section of the transceivers TRx1-TRx4.

Figure 5:
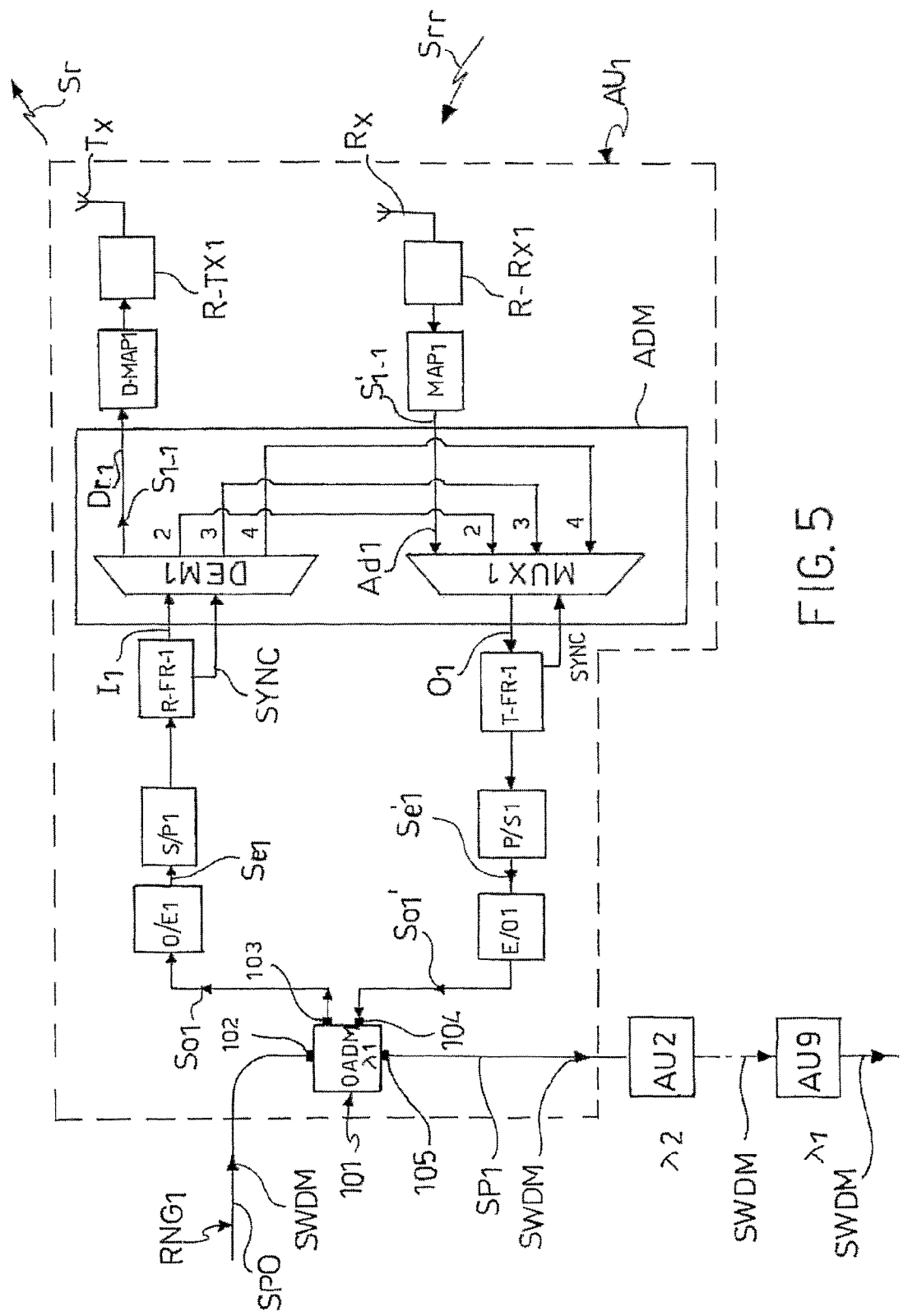
FIG. 5 shows a possible structure of antenna unit of said network, assigned for the downlink and uplink connection.

FIG. 5 shows the architecture of the first antenna unit AU1 included in the antenna station $AS_{i1}$, according to an embodiment of the invention. Moreover, the second AU2 and the ninth antenna unit AU9 are represented with schematic blocks in FIG. 5, since their structures (as well as the structure of the other antenna units not shown in FIG. 5) can be easily derived by the skilled person from the description given with reference to the first antenna unit. As already specified above, the first and the second antenna units AU1 and AU2 are adjacent antenna (connected by a first intermediate fiber link or span SP1) and the first and the ninth antenna units AU1 and AU9 are non adjacent units (as they are separated by eight interposed antenna units AU2-AU8).

The first antenna unit AU1 comprises a first optical add/drop multiplexer 101 (briefly, first OADM 101) having a main input port 102 coupled to the optical fiber ring RNG1 which is optically connected to the central unit CUi. Moreover, the first OADM 101 is provided with a dropping output port 103, an adding input port 104 and a main output port 105. This first OADM 101 is configured so as to receive at the main input port 102 the WDM optical signal $S_{WDM}$, to remove from it one optical channel signal, for example the first optical channel signal So1, having the first carrier wavelength $\lambda 1$, and direct it on the dropping output port 103. A further optical signal having said first carrier wavelength λ1 may be added to the WDM optical signal $S_{WDM}$ by inserting it at the adding input port 104. The WDM optical signal $S_{WDM}$ entering the input port 102 and to which the optical signal having the first carrier wavelength λ1 has been dropped/added is sent to the main output port 105. The other optical channel signals So2-So8 are not dropped by the first OADM 101 but pass through this device undergoing power losses. The first OADM 101 is a conventional device, well known to the skilled person and may include optical filters, for example, of the interferential type.

The dropping output port 103 is optically coupled to a first optical-to-electrical converter O/E1 (for example, similar to the optical-to-electrical converter O/E shown in FIG. 3B). Advantageously, the first optical-to-electrical converter O/E1 is analogous to the optical-to-electrical converter O/E of FIG. 3B and includes a respective electrical trans-impedance amplifier (or another device adapted to amplify the electrical signal resulting form the optical-to-electrical conversion) and a respective limiting amplifier (or another device adapted to reshape the electrical signal resulting from the optical-to-electrical conversion). The trans-impedance amplifier and the limiting amplifier are not shown in the figures and are not detailed described as they are well known to the skilled man and are normally included in the conventional optical-to-electrical converter.

The first optical-to-electrical converter O/E1 has a corresponding output line connected to an input serial line of a first serial-to-parallel converter S/P1 (e.g. analogous to the serial-to-parallel converter S/P of FIG. 3B) which may be of the conventional type and is provided with a clock data recovery unit (not shown in the figures) adapted to recover from the signal exiting the first optical-to-electrical converter O/E1 a timing signal necessary for correctly synchronize the serial-to-parallel conversion.

The plurality of output lines of the first serial-to-parallel converter S/P1 are connected to a first receiver framer device R-FR-1 having a common serial output I1 connected to an electrical add-and-drop multiplexer ADM and so as to send the corresponding synchronization signal SYNC to said electrical add-and-drop multiplexer ADM. The first receiver framer device R-FR-1 is analogous to the receiver framer device R-FR-described with reference to FIG. 3B.

The electrical add-and-drop multiplexer ADM (hereinafter, electrical ADM) allows to add and to drop electrical digital signals under the form of sub-data streams. According to a particularly schematic representation of FIG. 5, the electrical ADM (of the SDH type) includes a first electrical demultiplexer DEM1 having sub-data stream dropping function and a first electrical multiplexer MUX1 having sub-data stream adding function.

In greater detail, the first electrical demultiplexer DEM1 on the bases of the synchronization signal SYNC allows to separate the four sub-data streams $S_{1\text{-}1}$-$S_{1\text{-}4}$ each carrying useful information (received from the first receiver framer device R-FR-1) and select the first sub-data stream $S_{1\text{-}1}$ sending it on a dropping output line Dr1. The first electrical demultiplexer DEM1 has further lines 2, 3, 4 each carrying one of non selected sub-data stream $S_{1\text{-}2}$-$S_{1\text{-}4}$ and connected to respective inputs of the first electrical multiplexer MUX1.

The first electrical multiplexer MUX1 is provided with input lines 2, 3, 4, and an adding input line Ad1 allowing to multiplex a further sub-data stream $S_{1\text{-}1}'$ with the other sub-data streams $S_{1\text{-}2}$-$S_{1\text{-}4}$, sending the multiplex signal on a common output line O1.

As shown in FIG. 5, the dropping output line Dr1 of the first electrical demultiplexer DEM1 is connected to a first processing block D-MAP1 for performing a demapping of the first sub-data stream $S_{1\text{-}1}$. The first processing block D-MAP1 is connected to downlink remote transmitter apparatus R-TX1 (which may be of a conventional type) suitable to process the de-mapped sub-data stream $S_{1\text{-}1}$ and irradiate corresponding signals Sr from the transmitting antenna Tx.

The first antenna unit AU1 comprises an uplink remote receiver apparatus R-Rx1 for receiving radio signals Srr from the receiving antenna Rx. Said uplink receiver R-Rx1 is electrically connected to a first mapping processing blocks MAP1 having an output port connected to the adding input line Ad1 of the first electrical multiplexer MUX1.

The output line O1 of the first multiplexer MUX1 is connected to a first transmitter framer device T-FR-1, having the function of organizing the frame of the signal received in accordance with the SDH standard, connected (by means of a first parallel-to-serial converter P/S1) to a first electrical-to-optical converter E/O1. Said first transmitter framer device T-FR-1 is analogous to the transmitter framer device T-FR-i above described with reference to FIG. 3A. The first electrical-to-optical converter E/O1 allows to generate an optical channel signal So1' (at the first carrier wavelength λ1) carrying the information associated with the electrical signal exiting the first-serial-to-parallel converter P/S1 and to be sent to the adding input port 104 of the first OADM 101.

The second antenna unit AU2, which is a unit adjacent to the first unit AU1, includes components analogous to the ones of the first antenna unit AU1 but performs optical dropping and adding at the second carrier wavelength λ2. The ninth antenna unit AU9 comprises components analogous to the ones of the first antenna unit AU1 and is suitable to perform optical dropping and adding only at the first carrier wavelength λ1, and an electrical adding and dropping only of the second data-stream $S_{1\text{-}2}$.

With reference to the operation of the portion of the network 1 including the optical fiber ring RNG1, the antenna units AU1-AU32 are operatively grouped in a plurality of sub-groups each formed by non-adjacent nodes. Particularly, each group is formed by antenna units separated by a pre-established number of intermediate consecutive antenna units (e.g. eight intermediate antenna units). According to the described example, the following eight sub-groups are defined: G1, G2 ..., G7, G8. The first sub-group G1 is formed by the four antenna units AU1, AU9, AU17, AU25. Between the antenna units AU1 and AU9 are interposed the consecutive units AU2-AU8. The second group G2 is formed by the four antenna units AU2, AU10, AU18 and AU26. The eighth group G8 is formed by the four antenna units AU8, AU16, AU24 and AU32. Likewise, are defined the other groups G3-G7. According to the example made, each sub-group G1-G8 includes more than one non-adjacent antenna units, but the invention is also applicable in any case in which at least one sub-group includes at least two non-adjacent antenna units.

Moreover, in the network 1 each sub-group G1-G8 is associated to a respective carrier wavelength $\lambda_1, \ldots, \lambda_8$. Particularly, each of the eight optical channel signals So1-So8 (having a respective carrier wavelength $\lambda_1, \ldots, \lambda_8$) is used to serve a single sub-group G1-G8, respectively. Moreover, each optical channel signal of the plurality So1-So8 carries four sub-data streams (corresponding to four virtual containers of the SDH technology) each assigned to a particular antenna unit of the corresponding group of the plurality G1-G8. As an example, with reference to the first optical channel signal So1 (associated to the first group G1), the sub-data streams $S_{1\text{-}1}$, $S_{1\text{-}2}$, $S_{1\text{-}3}$ and $S_{1\text{-}4}$ are assigned to the antenna units AU1, AU9, AU17 and AU25, respectively.

In operation, the downlink processing/conversion section DL-S of the central unit CUi of FIG. 3A receives electric signals e1-e4 (as an example, in digital form) from the respective base processing station BSPPi, each carrying the useful information connected to a communication between two specific users of the network 1. Each electric signal of the plurality e1-e4 is processed by a corresponding downlink processing block MAP which performs the suitable mapping of the information according to the SDH standard generating four signals organized according to a VC4-4c format.

The four VC4-4c signals are fed by corresponding electric lines to the multiplexer MUX which allows to produce an electrical multiplexed signal and send it to the input port of the transmitter framer device T-FR-i. The transmitter framer device T-FR-i organizes the received electrical signal in a STM-16 frame on a plurality of lines. After a serial-to-parallel conversion performed by the converter S/P, the first electrical signal Se1 (having the overhead as above described with reference to FIG. 4) is generated and then converted in the first optical channel signal So1 at the first carrier wavelength $\lambda 1$.

The first optical channel signal So1 together with the other optical channel signals So2-So8 generated by further processing branches of the central unit CUi, are fed to the optical multiplexer OM. Each optical channel signal So2-So8 is associated to a corresponding electrical data stream Se2-Se8 of the STM-16 type. Each of the data streams Se2-Se8 includes four virtual containers (analogous to the ones of the first electrical signal Se1 described with reference to FIG. 4) and each associated to a particular antenna unit of the corresponding group G2-G8.

As an example, according to the pre-established configuration of the network 1 the sub-data streams $S_{1-1}$, $S_{1-2}$, $S_{1-3}$ and $S_{1-4}$ are associated to the antenna units AU1, AU9, AU17 and AU25, respectively. Analogously, sub-data streams carrying useful information $S_{2-1}$, $S_{2-2}$, $S_{2-3}$ and $S_{2-4}$ associated to the second optical channel signal So2 (at $\lambda 2$) are destined to the antenna units AU2, AU10, AU18 and AU26, respectively.

The optical multiplexer OM multiplexes the first optical channel signal So1 and the plurality of optical signals So2-So8 producing the WDM signal SwDM, sent on the optical fiber ring RNG1. The WDM signal $S_{WDM}$ propagating along a first span SP0 of the optical fibre ring RNG1 undergoes an optical power attenuation dependent on each carrier wavelength. The first antenna unit of AU1 receives the WDM optical signal $S_{WDM}$ from the first span SP0 and processes the signals as will be described in greater detail below, in order to radiate associated radiofrequency signals from the transmitting antenna Tx.

With reference to the uplink and to FIG. 5, the first antenna unit AU1 receives radio signals Srr from the receiving antenna Rx and, after processing which will be described below, converts them into optical signals at the first carrier wavelength $\lambda_1$ and send it on the optical fiber ring RNG1. At each antenna station AU1-AU32 the WDM optical signal $S_{WDM}$ undergoes a specific processing up to the reaching of the receiving port of the central unit CUi.

The uplink processing/conversion section UL-S of the central unit CUi (FIG. 3B) receives the WDM optical signal $S_{WDM}$ and the demultiplexer O-DM selects each optical channel signal So1-So8. Particularly, the first optical channel signal So1, having the first carrier wavelength $\lambda_1$, is selected and converted into an electrical received signal Selr, by the optical-to-electrical converter O/E.

Subsequently, a serial-to-parallel conversion of the first electrical received signal Se1r is performed to generate on the plurality of output lines electric signals which are processed by the receiver framer device R-FR-i to detect the Frame Alignment signal FAS according to the SDH standard.

Moreover, the electrical signal exiting the receiver framer device R-FR-i is demultiplexed by the demultiplexer D-MUX and sent to the associated receiving section of the transceiver TRx1-TRx4, after a demapping step performed by the blocks D-MAP.

The operation of the first antenna unit AU1 (FIG. 5) is described in detail herein below.

During downlink operation, the first antenna unit AU1 receives the WDM optical signal $S_{WDM}$ from the optical fiber ring RNG1. The OADM 101 selects the first optical channel signal So1 from the WDM optical signal $S_{WDM}$ and converts it by means of the first converter O/E1 into the first electrical signal Se1.

The first electrical signal Se1 is converted from a serial form into a parallel form and is processed by the first receiver framer device R-FR-1 which recognizes a frame alignment signal carried by the first electrical signal in order to produce a synchronization signal SYNC fed to the electrical ADM.

The signal exiting from the first receiver framer device R-FR-1 is demultiplexed by the first electrical demultiplexer DEM1 which separates the four sub-data streams $S_{1-1}$, $S_{1-2}$, $S_{1-3}$, $S_{1-4}$ and sends the first sub-data stream $S_{1-1}$ on the dropping output line Dr1. The first sub-data stream $S_{1-1}$ is selected by the first demultiplexer DEM1 on the bases of the identification data carried by first electrical signal Se1 referred to said sub-data stream.

The non selected sub-data stream $S_{1-2}$-$S_{1-4}$ are fed to the input ports 2-4 of the first electrical multiplexer MUX1. The selected sub-data stream $S_{1-1}$ is processed by the demapping block D-MAP1 and is sent to the downlink remote transmitter apparatus R-TX1 which performs the necessary modulation operations in accordance with conventional technology.

As an example, the downlink remote transmitter apparatus R-TX1 performs, by means of corresponding processing blocks, a digital-to-analog conversion, a conversion of the frequency of the resulting analog signal into an intermediate frequency. Moreover, the downlink remote transmitter apparatus R-TX1 converts the modulated signal in a radiofrequency signal. The radiofrequency signal is then, advantageously, amplified and radiated by means of the transmitting antenna Tx. This radiated signal (represented by the signal Sr in FIG. 5) can be received by the first or the second mobile telephone UE-1, UE-2 and has, as an example, a carrier frequency of comprise from 2110 MHz to 2170 MHz, for UMTS technology.

During uplink operation, the receiving antenna Rx receives a radiofrequency signal Srr that is emitted, as en example, by the first mobile telephone UE-1 or by the second mobile telephone UE-2 (FIG. 1).

This radiofrequency signal is sent to the uplink remote receiver apparatus R-Rx1 which performs suitable processing. Particularly, the radiofrequency signal Srr undergoes a low noise amplification, a filtering step to substantially eliminate high-frequency noise and a conversion of the radiofrequency signals into signals at an intermediate frequency. For example, the intermediate frequency signals have frequencies ranging between 70 and 110 MHz.

Preferably, the frequency conversion step is so as to have also a channel filtering function, i.e. is such as to perform a selection of a particular transmission channel, from among the plurality of channels received at the receiving antenna Rx. Advantageously, the uplink remote receiver apparatus R-Rx1 includes an automatic gain amplifier AGC (for example of the conventional type) for reducing the power dynamics of the input signal.

Moreover, a low-pass filtering and an analog-to-digital conversion is performed by the uplink remote receiver apparatus R-Rx1, which feeds to the first adding input port Ad1 the electrical sub-data stream $S_{1-2}'$ carrying the useful information received with the signal Srr. The first electrical multiplexer MUX1 sends on the corresponding output line O1 an electrical multiplexed signal carrying the sub-data streams $S_{1-1}$, $S_{1-2}'$, $S_{1-3}$ and $S_{3-4}$, which have been multiplexed according to a time division technique.

The multiplexed electrical signal presents on the line O1 undergoes conventional processing performed by the transmitter framer device T-FR-1 and the first parallel-to-serial converter P/S1 in order to generate a further first electrical signal Se1' having an STM-16 format. The further first electrical signal Se1' is converted by the first converter E/O1 in an optical channel signal So1', having the first carrier wavelength λ1. This optical channel signal So1' is supplied to the adding input port 104 of the first OADM 101.

It has to be noticed that, as an example, the electrical dropping and adding of the first sub-data stream $S_{1-1}/S_{1-1}'$ occurs even if no useful information has to be radiated from the main transmitting antenna Tx and no useful information has been received at the receiving antenna Rx. In this case, the first electrical add-and-drop ADM drops a first sub-data stream $S_{1-1}$ which does not carry any useful information (i.e. a void virtual container VC4-4c) and adds a sub-data stream $S_{1-1}'$ also carrying no information.

The above mentioned electrical-to-optical conversion performed by the first converter E/O1 allows to generate the optical signal So1' having an optical power sufficient for allowing the propagation along the fiber optical fiber ring RNG1 and reaching the subsequent antenna unit served by the first carrier wavelength λ1 with a power amount suitable for its correct receiving processing performed by said subsequent antenna unit. Particularly, the necessary power amount is obtained by the optical-to-electrical conversion (performed by the first optical-to-electrical converter O/E) and by the subsequent electrical-to-optical conversion (performed by the first electrical-to-optical converter E101), advantageously, without the need of adding all-optical amplifiers along the optical fiber ring RNG1.

Advantageously, the electrical signals corresponding to the sub-data streams $S_{1-2}$-$S_{1-4}$, passing through the electrical add-and-drop ADM, are subjected in the first antenna unit AU1 to a regeneration processing. Particular, such regeneration may be, preferably, of the 3R type. In general a 3R regeneration includes the following processing: Re-Amplification, Re-Shaping, Re-Timing.

With reference to the first antenna unit AU1, the Re-amplification process is connected to the above mentioned optical-to-electrical and electrical-to-optical conversions (O/E1 and E/O1). Moreover, a power amplification of the first electrical signal Se1 is also performed by the trans-impedance amplifier The Re-shaping of the first electrical Se1 is performed by the above mentioned trans-impedance amplifier together with the limiting amplifier also included in the first optical-to-electrical converter O/E1.

Moreover, it is noticed that, advantageously, the serial-to-parallel conversion of the first serial-to-parallel converter S/P1 is performed with the correct timing thanks to the clock data recovery unit. The parallel-to-serial converter P/S1 is time-locked to the first electrical signal Se1, so as to provide the further first electrical signal Se1' in which a re-timing has been performed.

In other words, the processing of the passing through sub-data streams $S_{1-2}$-$S_{1-4}$ may occur in the same antenna unit (the first antenna unit AU1), wherein the first sub-data stream $S_{1-1}$ has been dropped and replaced, and not in a specifically dedicated regeneration station.

The optical channel signal So1' passes through the intermediate antenna units AU2-AU8 which do not perform any processing of the information carried out by the optical channel signal So1'. It has to be noted that the optical channel signal So1' undergoes an optical power attenuation both when propagates along the fiber links of the optical fiber ring RNG1 and when passes through any intermediate antenna unit AU2-AU8. In fact, in any intermediated antenna unit AU2-AU8 the optical channel signal So1' passes through the corresponding OADM (arranged to drop another carrier wavelength) undergoing optical power attenuation. The optical power attenuation in each intermediate antenna unit is due, for example, to power losses associated to optical filters included in the optical add-and-drop or to connectors coupling optical components.

Said optical signal So1', together with the other optical channel signals So2-So8, resulting by the processing occurred in each associated antenna unit, reaches the ninth antenna unit AU9 which performs optical dropping at the first carrier wavelength λ1 and corresponding electrical dropping and adding in connection with the second sub-data stream $S_{1-2}$, analogously to the optical and electrical processing described in connection with the first antenna unit AU1.

Moreover, in the ninth antenna unit AU9 the electrical-to-optical conversion, performed to re-generate the optical signal at the first carrier wavelength λ1, produces an optical signal having a power amount sufficient to the propagation along the remaining portion of optical fiber ring RNG1 up to the subsequent antenna unit AU17 assigned to said first carrier wavelength.

The other optical channel signals So2-So8, included in the multiplexed signal $S_{WDM}$, during the propagation along the optical fiber ring RNG1 undergo power attenuation, optical and electrical add-and-drop in the associated antenna units belonging to the respective sub-groups G2-G8, analogously to the first optical channel signal So1. Then, the multiplexed optical signal $S_{WDM}$ reaches the central unit CUi in which it undergoes the processing above described with reference to FIG. 3B.

Advantageously, the above described allocation of the optical channel signals So1-So8 and of the respective sub-data streams among the antenna units AU1-AU32 is pre-established and is independent on the content of the useful information associated to each sub-data stream carried by the optical channel signals So1-So8.

As it is clear from the above description, an antenna unit (as an example the second antenna unit AU2) can send useful information destined to an adjacent antenna unit (e.g. AU3) or to another antenna unit (e.g. AU9) associated to a different carrier wavelength, only after this useful information has reached the main station BNi to be suitably inserted in an optical channel signal (So3 or So1) serving the wished antenna unit (AU3 or AU9). As an example, it can be considered a situation in which an antenna unit AUj (served by an optical carrier wavelength λj) receives a radio signal carrying information directed to a user located into a cell site sector corresponding to an adjacent antenna unit AUj+1 (served by a wavelength λj+1). The optical channel signal at %j exiting the antenna unit AUj and carrying the useful information added on a sub-data stream passes through the adjacent antenna unit AUj+1, without undergoing drop processing. This optical channel signal at λj, after propagation along the ring RNG1, reaches the central unit CUi in which it is received. Then, the main station BNi processes the useful information associated with the sub-data stream added at the antenna units AUj and inserts it on an optical channel signal of carrier wavelength λj+1 suitable to be dropped by the antenna unit AUj+1.

Analogously, two antenna units assigned to the same optical carrier wavelength but associated to two different sub-data streams cannot directly exchange information. An information exchange is possible only after that a processing of the useful information added at an antenna unit is performed by the main station BNi, in order to insert the received information in the sub-data stream associated to the antenna unit concerned. In other words, according to a particular embodiment of the invention, an antenna unit (as an example the third antenna unit AU3) associated to the third carrier wavelength λ3 and to the sub-data stream $S_{3-1}$ can send useful information to antenna units of the same sub-group (i.e. the sub-group G3) associated to different sub-data streams (i.e. $S_{3-2}$) only after that said useful information has reached the main station BNi to be processed. In the main station BNi the useful information associated to the third carrier wavelength λ3 is processed in order to be inserted in the sub-data stream associated to the particularly antenna unit to which the information was directed.

A change of the pre-established configuration associating carrier wavelengths and sub-data streams to each antenna unit is, for example, possible only after a traffic communication interruption and a substitution of the optical and electrical devices (particularly, OADMs and ADMs) included in each antenna unit is performed. Alternatively to the device substitution, optical and/or electrical devices which allow to be remotely and/or automatically adjusted to operate at another optical carrier wavelength or for another sub-data stream can be employed.

Advantageously, each optical fiber link connecting any pair of adjacent antenna units (AUi, AUi+1) and forming part of the optical fiber ring RNG1 is of the passive type. To the purpose of the present invention, a passive optical link (e.g. a fiber link) includes no active devices, i.e. no devices capable of processing the multiplexed signal $S_{WDM}$. For example, no optical amplifier and no regeneration equipment capable to amplify the optical power amount of the multiplexed optical signal $S_{WDM}$ are included in a passive link. The possibility of using passive optical fiber links allows a relevant cost saving in the implementation of the whole communications system.

Moreover, the allocation of the carrier wavelengths among each sub-group G1-G8 of non adjacent nodes can be, advantageously, established taking into consideration the length of the optical fiber path covered by a corresponding optical channel signal to reach the nearest antenna unit associated to the specific carrier wavelength, together with the fiber attenuation coefficient suffered by said carrier wavelength.

As an example, the first antenna unit AU1 is connected to the output port of the central unit CUi by the first span SP0 having a first length L1. Moreover, the first carrier wavelength λ1 associated to the first antenna unit AU1 shows a first value of fiber attenuation coefficient (dB/m). To the second antenna unit AU2, which is connected to the central unit CUi by a whole span having a length equal to the sum of L1 and L2 (where L2 is the length of the first intermediate span SP1), is associated a respective carrier wavelength showing a second value of fiber attenuation coefficient lower than the first value. The other carrier wavelengths can be allocated among the other antenna units with an analogous criteria, so that progressively further antenna units are respectively associated with carrier wavelength having progressively lower fiber attenuation coefficient. The allocation of the carrier wavelengths among the antenna units may also be performed taking into account the fiber dispersion coefficient associated to each carrier wavelength.

It has to be underlined that the teachings of the invention can be applied also to a network including processing nodes structurally and/or functionally different by the antenna unit above described. Particularly, the network of the invention can include processing nodes which do not comprise only a single antenna unit but comprise apparatuses for serving two or more sectors of a cell site. It has to be noted that the above mentioned definition of adjacent and non-adjacent antenna units is also valid for these type of processing nodes. Likewise, the definition of sub-group may be applied to other types of processing nodes.

As an example, a processing node may include the apparatuses necessary to serve all the sectors of a whole cell site, and therefore acting as an antenna station. Particularly, said antenna station is served by one optical channel signal of the multiplexed optical signal $S_{WDM}$, which can be used also to serve another antenna station forming another non-adjacent processing node of the network and included in the same sub-group associated to the same optical carrier wavelength. The optical channel signal associated to said antenna station carries a plurality of sub-data streams each assigned to one of the sectors served by the antenna station.

This type of antenna station included in a single processing node is analogous to the antenna unit AU1 of FIG. 5 unless for the fact that the electrical add-and-drop multiplexer herein used is adapted to drop and to add a plurality of sub-data streams. The plurality of sub-data streams dropped in a single antenna station are processed to obtain radio signals having distinct radio carriers and to be radiated by corresponding antennas devices.

Moreover, it is also possible to use, for all the types of processing nodes defined, a scheme in which the useful information associated to distinct radio carriers is organised within a same sub-data stream (for example the first sub-data stream $S_{1-1}$ of the type VC4-4c). In this case, the processing node is provided with an electrical add-and-drop multiplexer suitable to separate the data associated to a particular radio carrier from the others data.

Advantageously, according to a known method in radio transmission, the antenna units above described may also be able to operate with additional signals relating to the diversity (for example, spatial or polarization), so as to compensate for possible causes of disturbance or attenuation in the air which may adversely affect the transmission/reception the radio carriers.

In the network realized in accordance with the invention, it is possible to introduce protection schemes in order to face fault or damage inside the optical fiber ring. As an example, a double ring architecture can be implemented, that is to say that another ring additional to the optical fibre ring RNG1 is used. This additional fibre ring shares the antenna devices with the ones of the optical fibre ring RNG1 and duplicates the other devices included in each antenna unit (optical add-and-drop, mapping and the demapping devices, transmitter and receiver framer devices, serial/parallel converter and optical/electrical converter, electrical add-and-drop).

As an example, the two optical fibre rings can be activated contemporaneously and in case of interruption of one of the rings, the communication is maintained by the non damaged one.

A particular example of the parameters defining the configuration of the sub-network of FIG. 2 (including thirty-two antenna units AU1-AU32), is described hereinafter:

the eight optical channel signals So1-So8 belong to the C-WDM grid and each has a nominal carrier wavelength included in the range from 1470 nm to 1610 nm with 20 nm channels spacing;

the whole data stream of the electrical signal (e.g. the first signal Se1) associated to each optical channel signal is of the STM-16 type;

each sub-data stream is organized according to a virtual container of the type VC4-4c;

the optical power of each optical channel signal So1-So8, exiting the respective electrical-to-optical converter, is 0 dBm;

each antenna unit AUi has a single OADM;

a uniform configuration is applied, that is to say that the lengths of the optical fibre links (spans) connecting two adjacent antenna units are the same and equal to a value L. The length of the optical fibre link connecting the central unit CUi to the first antenna unit according the propagation direction (AU1) and the length of the optical fibre link connecting the last antenna unit (AU32) to the central unit CUi are both equal to L. The overall span length is the sum of the single span lengths L, each span connecting two adjacent antenna units.

the transmission penalty for the coverable span length L is equal to 1 dB;

the optical-to-electrical converters (e.g. O/E and O/E1 above described) and the electrical-to-optical converters (e.g. E/O and E/O1 above described) have a sensitivity of −18 dBm and are able to ensure a Bit Error Rate of the order of $10^{-10}$;

the optical connectors employed (for example, connecting the fibre link to the output and input port of the optical add-and drop) have an insertion loss of 0.25 dB;

the fibres employed are step index fibres of the single mode type;

the optical channel signal dropped at the first antenna unit AUi (that is to say, the first unit reached by the multiplexed signal in the propagation direction) is the one having the lowest carrier wavelength (i.e. 1470 nm) in order to compensate the higher fibre attenuation, due to a higher attenuation coefficient, suffered by the lowest carrier wavelength. The optical channel signal having the lowest attenuation coefficient is dropped at the last antenna unit (AU32).

Moreover, the optical passive devices have the following characteristics:

the CWDM optical multiplexer OM employed in the downlink processing/conversion section DL-S (FIG. 3A) of the central unit Cui shows a maximum insertion loss equal to: 3.6 dB for the first channel (1470 nm); 0.8 dB for the eighth channel (1610 nm);

the CWDM optical demultiplexer O-DM employed in the uplink processing/conversion section UL-S (FIG. 3B) of the central unit CUi shows a maximum insertion loss equal to: 0.8 dB for the first channel (1470 nm); 3.6 dB for the eighth channel (1610 nm);

the total insertion loss introduced for each channel by the optical multiplexer OM combined with the ones introduced by the optical demultiplexer O-DM are equal about to 4.4 dB;

the OADM employed in each antenna unit has a maximum insertion loss for an added/dropped signal equal to 1.0 dB, in the considered optical carrier wavelengths range;

the OADM employed in each antenna unit has a maximum insertion loss for a passing through signal equal to 1.0 dB.

The above listed characteristics do not include possible insertion losses due to imperfect optical connections. All the optical filters included in the optical add-and-drop devices have been considered ideal as far as the channel isolation and the cross-talk. Considering the above described configuration, an optical fibre ring RNG1 having a length of about 30.5 Km (corresponding to a length of the single span between adjacent nodes equal to about 0.9 Km) may be arranged. It is underlined that the optical fiber rings connecting antenna units in conventional networks have lengths lower than 10 Km.

The present invention shows the relevant advantage of allowing a better exploitation of the capacity offered by the optical communications. In fact, the allocation of the carrier wavelengths above described allows to serve processing nodes (e.g. antenna units or antenna stations) connected by an optical path (particularly, a fiber ring) having a length greater than the one obtainable by conventional techniques resulting, in addition, cost-effective. Moreover, the invention allows to serve a number of processing nodes greater than the one served by the networks realized in accordance with the prior art techniques.

Thanks to the configuration of the invention, a single carrier wavelength is associated to a respective sub-group of non adjacent nodes allowing to serve the node using a reduced number of regeneration stations (equal to the number of the nodes to be served) without requiring, necessarily, further regeneration or amplifying stations.

In addition, the configuration of the invention can be conveniently applied to the technique of using a single optical carrier wavelength for transporting the data streams associated to more than one node by means of a time division multiplexing technology. Thus the transport information capacity offered by a single optical carrier is used in an efficient manner and without nullifying the opportunities of band saving offered by the access technologies, such as the W-CDMA.

The possibility of increasing the length of the optical path connecting the served processing nodes and the number of the nodes in comparison with the conventional systems, can be advantageously applied to the RoF systems, fully responding to the needs of the modern radio mobile communications systems.

The invention claimed is:

1. A communications method between a main station and processing nodes served by the main station and able to exchange information via the main station, comprising:

interconnecting the main station and the processing nodes in an optical path defining adjacent nodes and non-adjacent nodes in a series configuration so as to define an ordered distribution of the processing nodes according to an optical propagation direction with respect to the main station;

operatively grouping the processing nodes into a plurality of distinct sub-groups, each sub-group formed by non-adjacent nodes, at least one of the sub-groups including at least two processing nodes;

generating at the main station a multiplexed optical signal propagating along the optical path for serving the processing nodes, the multiplexed optical signal comprising a plurality of optical channel signals having a respective plurality of distinct carrier wavelengths, each carrier wavelength being associated with a respective sub-group of nodes, wherein the optical signal undergoes an optical power attenuation along the optical path dependent on each carrier wavelength;

allocating the carrier wavelengths among each sub-group of non-adjacent processing nodes based on the attenuation suffered by the carrier wavelengths along the optical path, so that processing nodes progressively farther from the main station are respectively associated with a carrier wavelength having progressively lower attenuation; and serving each processing node of each sub-group of processing nodes with a respective portion of a corresponding optical channel signal having the associated carrier wavelength.

2. The communications method according to claim 1, further comprising, at each processing node of the respective sub-group, processing at least an optical power of a corresponding optical channel signal having the associated carrier wavelength.

3. The communications method according to claim 2, wherein the processing of the optical power comprises:
optically-to-electrically converting the corresponding optical channel signal to obtain a digital electric signal;
electrically processing the digital electric signal, and electrically-to-optically converting a signal resulting from the electrical processing.

4. The communications method according to claim 3, wherein said electrically processing of the digital electric signal comprises electrically amplifying and re-shaping the digital electric signal.

5. The communications method according to claim 4, wherein said electrically processing and said electrically-to-optically converting are time-locked to said digital electric signal.

6. The communications method according to claim 1, wherein the optical path comprises optical links coupling pairs of adjacent processing nodes, the optical links being of a passive type.

7. The communications method according to claim 6, wherein said optical links comprise optical fibres.

8. The communications method according to claim 1, wherein the main station and the processing nodes are in a mobile radio communications system and each of said processing nodes is adapted to generate and receive radio signals serving at least a sector of a cell site of the mobile radio communications system.

9. The communications method according to claim 1, wherein each optical channel signal carries sub-data streams each destined to a corresponding processing node of the respective sub-group, the sub-data streams being organized according to a time division multiplexing technique.

10. The communications method according to claim 9, wherein the propagating of the multiplexed optical signal comprises:
generating a first optical channel signal having a first carrier wavelength and associated with a first sub-group of processing nodes, the first optical channel signal being associated with a first electrical digital signal comprising a plurality of sub-data streams, each processing node of the first sub-group being associated with at least one corresponding sub-data stream; and
sending the first optical channel signal together with other optical channel signals on the optical path.

11. The communications method according to claim 10, wherein the serving of each processing node of each sub-group of processing nodes comprises:
processing at a first processing node, included in the first sub-group, the first optical channel signal for extracting a first sub-data stream;
generating from the extracted first sub-data stream a corresponding first downlink radio signal to be radiated; and
radiating the corresponding first downlink radio signal.

12. The communications method according to claim 11, wherein the processing at the first processing node further comprises:
receiving the multiplexed optical signal at an optical input of the first processing node;
selecting from the multiplexed optical signal the first optical channel signal;
converting the first optical channel signal into the first electrical digital signal; and
extracting from the first electrical digital signal the first sub-data stream to be processed, so as to generate the first downlink radio signal.

13. The method according to claim 12, further comprising:
receiving at an antenna input of said first processing node a first uplink radio signal;
processing said first uplink radio signal for generating a first uplink sub-data stream;
adding the first uplink sub-data stream to the first electrical digital signal as resulting from the extracting step for generating a second electrical signal;
converting the second electrical signal into an output optical signal having the first carrier wavelength; and
sending the output optical signal together with the other optical channel signals along the optical path.

14. The method according to claim 10, wherein each sub-data stream comprises a respective identification data for associating the sub-data stream with a corresponding processing node.

15. The method according to claim 10, wherein said plurality of sub-data streams are organized according to a transport standard-protocol selected from the group: synchronous digital hierarchy, synchronous optical network, gigabit ethernet, and common public radio interface.

16. The method according to claim 1, wherein said optical path comprises an optical ring.

17. A communications network comprising:
a plurality of processing nodes interconnected in an optical path defining non-adjacent nodes and adjacent nodes, the processing nodes being operatively grouped into a plurality of distinct sub-groups each formed by non-adjacent processing nodes, at least one of the sub-groups including at least two processing nodes; and
a main station interconnected with the processing nodes in the optical path and adapted to generate a multiplexed optical signal to be propagated along the optical path for serving the processing nodes, the optical signal comprising a plurality of optical channel signals having a respective plurality of distinct carrier wavelengths,
wherein the optical signal undergoes an optical power attenuation along the optical path dependent on each carrier wavelength,
wherein the processing nodes are able to exchange information via the main station,
wherein the main station and the processing nodes are interconnected in a series configuration so as to define an ordered distribution of the processing nodes according to an optical propagation direction with respect to the main station,
wherein the network is configured so as to serve each sub-group of processing nodes with a respective portion of a corresponding optical channel signal having the associated carrier wavelength, and wherein each sub-group of non-adjacent processing nodes has an associated carrier wavelength based on the attenuation suffered by the associated carrier wavelength along the optical path, so that processing nodes progressively farther from the main station are respectively associated with a carrier wavelength having progressively lower attenuation.

18. The network according to claim 17, wherein each processing node comprises a first apparatus adapted to process an optical power of the corresponding optical channel signal serving the respective processing node.

19. The network according to claim 18, wherein said first apparatus comprises:
   an optical-to-electrical converter adapted to convert the optical channel signal to obtain a digital electric signal;
   an electrical processing apparatus adapted to process the digital electric signal; and
   an electrical-to-optical converter adapted to convert in optical form a signal resulting from the electrical processing apparatus.

20. The network according to claim 19, wherein said optical-to-electrical converter comprises an electrical amplifier and a re-shaping device of the digital electric signal.

21. The network according to claim 19, wherein said electrical processing apparatus and said electrical-to-optical converter are time-locked to said digital electric signal.

22. The network according to claim 17, wherein the optical path comprises optical links coupling each pair of adjacent processing, the optical links being of a passive type.

23. The network according to claim 22, wherein said optical links comprise optical fibers.

24. The network according to claim 17, wherein the main station and the processing nodes are in a mobile radio communications system and each of said processing nodes is adapted to generate and receive radio signals serving at least a sector of a cell site of the mobile radio communications system.

25. The network according to claim 17, wherein each optical channel signal carries sub-data streams each destined to a corresponding processing node of the respective sub-group, the sub-data streams being organized according to a time division multiplexing technique.

26. The network according to claim 25, wherein the main station comprises:
   equipment adapted to generate a first optical channel signal having a first carrier wavelength and associated with a first sub-group, the first optical signal carrying information associated with a first electrical digital signal comprising a plurality of sub-data streams each associated with a corresponding processing node of the first sub-group; and
   an optical multiplexer adapted to send the first optical channel signal together with other optical channel signals on the optical path.

27. The network according to claim 26, wherein said first sub-group comprises a first processing node comprising:
   a second apparatus adapted to process the first optical channel signal and extract a first sub-data stream;
   a radio transmitter adapted to generate from the first sub-data stream a corresponding first downlink radio signal to be radiated; and
   an antenna for radiating said first downlink radio signal.

28. The network according to claim 27, wherein the first processing node further comprises:
   an optical input port adapted to receive the multiplexed optical signal;
   an optical add-and-drop device adapted to select from the multiplexed optical signal the first optical channel signal;
   a first converting device adapted to convert said first optical channel signal into the first electrical digital signal; and
   an electrical add-and-drop device adapted to extract from the first electrical digital signal the first sub-data stream to be processed so as to generate the first downlink radio signal.

29. The network according to claim 28, wherein the first processing node comprises:
   a receiver device having an antenna input adapted to receive a first uplink radio signal and process the first uplink radio signal so as to generate a first uplink sub-data stream, the electrical add-and-drop device being adapted to add the first uplink sub-data stream to the first electrical digital signal so as to generate a second electrical signal; and
   a second converting device adapted to convert the second electrical signal into an output optical signal having the first carrier wavelength, the optical add-and-drop device being adapted to add the output optical signal to the multiplexed optical signal and send the multiplexed optical signal along the optical path.

30. The network according to claim 29, wherein each sub-data stream comprises respective identification data for associating the sub-data stream with a corresponding processing node.

31. The network according to claim 30, wherein said plurality of sub-data streams are organized according to a transport standard-protocol selected from the group: synchronous digital hierarchy, synchronous optical network, gigabit ethernet, and common public radio interface.

32. The network according to claim 27, wherein:
   said first processing node is connected to an output port of the main station by an optical fibre span having a first length, the first carrier wavelength associated with the first node having a first value of fiber attenuation coefficient, and
   said network comprising at least a second processing node associated with a further carrier wavelength and connected to the output port of the main station by an optical fibre connection comprising the first span and having a second length greater than the first length, the further carrier wavelength having a second value of fiber attenuation coefficient lower than said first value.

* * * * *